US008807321B2

(12) United States Patent
Claris

(10) Patent No.: US 8,807,321 B2
(45) Date of Patent: Aug. 19, 2014

(54) MAILPIECE FEED DEVICE HAVING AN ANGULAR DELAY

(75) Inventor: Yannick Claris, Fontenay aux Roses (FR)

(73) Assignee: Neopost Technologies, Bagneux (FR)

( * ) Notice: Subject to any disclaimer, the term of this patent is extended or adjusted under 35 U.S.C. 154(b) by 156 days.

(21) Appl. No.: 13/281,853

(22) Filed: Oct. 26, 2011

(65) Prior Publication Data

US 2012/0103757 A1 May 3, 2012

(30) Foreign Application Priority Data

Oct. 27, 2010 (EP) .................................... 10306175

(51) Int. Cl.
*B65G 47/244* (2006.01)

(52) U.S. Cl.
USPC ............................... 198/415; 198/597; 271/2

(58) Field of Classification Search
CPC .................................................... B65H 47/244
USPC ........... 271/2, 314, 251, 272, 225; 198/371.3, 198/370.09, 832, 415, 457.02, 597
See application file for complete search history.

(56) References Cited

U.S. PATENT DOCUMENTS

| | | | | |
|---|---|---|---|---|
| 5,180,154 | A * | 1/1993 | Malick | 271/2 |
| 5,718,313 | A * | 2/1998 | Sekine | 192/24 |
| 6,102,391 | A * | 8/2000 | Malick et al. | 271/225 |
| RE37,007 | E | 1/2001 | Gerlier | |
| 6,464,217 | B1 * | 10/2002 | Kulpa et al. | 271/116 |
| 6,715,408 | B1 * | 4/2004 | Rossi | 100/32 |
| 7,264,239 | B2 * | 9/2007 | Kawai | 271/188 |
| 7,478,808 | B2 * | 1/2009 | Bernard et al. | 271/248 |
| 7,975,831 | B2 * | 7/2011 | Ponti | 198/597 |
| 8,328,177 | B2 * | 12/2012 | Claris | 271/2 |
| 2011/0060453 | A1 * | 3/2011 | Mazeiller | 700/230 |

FOREIGN PATENT DOCUMENTS

| | | | |
|---|---|---|---|
| DE | 299 02 106 | U1 | 6/1999 |
| EP | 0 577 403 | A2 | 1/1994 |
| EP | 2 067 722 | A1 | 6/2009 |
| WO | 03/064159 | A1 | 8/2003 |

OTHER PUBLICATIONS

European Search Report of EP 10 30 6175 dated Jan. 24, 2011.

* cited by examiner

*Primary Examiner* — Ramya Burgess
*Assistant Examiner* — Thomas Randazzo
(74) *Attorney, Agent, or Firm* — Sughrue Mion, PLLC

(57) ABSTRACT

A feeder for a mail-handling machine is provided with a conveyor device having at least one row of drive rollers comprising at least first and second drive rollers standing proud through a mailpiece-receiving deck of the feeder and controlled by a suitable drive mechanism, said first and second drive rollers being inclined at an angle α relative to a perpendicular to a longitudinal referencing wall, and the second drive roller being driven in rotation with a first predetermined delay relative to the first drive roller, which is the closer to the referencing wall.

13 Claims, 2 Drawing Sheets

MAILPIECE FEED DEVICE HAVING AN ANGULAR DELAY

TECHNICAL FIELD

The present invention relates to the field of mail-handling, and it relates more particularly to an improved drive member designed to equip a mailpiece conveyor device of a mailpiece feed device for a mail-handling machine.

PRIOR ART

Postal specifications that govern printing of postal imprints are very precise and, in particular, they define the position of such an imprint relative to the top edge of the envelope. Printing the imprint in that position requires the envelope to be properly jogged. Since the envelope is conveyed parallel to a referencing wall (or “jogging” wall), any defective jogging in the feed magazine (or feeder) causes the same defect downstream in the selector device, and then still further downstream as the envelope goes through the print module for printing the postal imprint. It is thus very important for such defective jogging to be monitored and corrected automatically in order to avoid systematic manual re-jogging by the operator on inserting a stack of envelopes into the feeder.

Nowadays, in order to solve that problem, it is known that the conveyor rollers of the feeder can be inclined so that, by conveying the envelopes diagonally, said envelopes can be shifted towards the referencing wall while also being conveyed downstream towards the selector device. Unfortunately, by exerting a considerable re-jogging force on the envelope, such a configuration brakes said envelope and, when the envelope is a thin envelope, can even damage it. In addition, the force exerted depends on the position of each conveyor roller relative to the selector device.

In addition to the conveyor rollers that are disposed parallel to the referencing wall, the Applicant has already proposed to add re-jogging rollers that are disposed perpendicularly to the conveyor rollers and that operate with a phase advance relative thereto.

Unfortunately, and although to a lesser extent than with the preceding configuration, there remains a tendency for the envelopes to be braked due to the action of the re-jogging rollers, and the taller and/or the heavier the stack of envelopes, the greater the extent to which they tend to be braked.

OBJECT AND DEFINITION OF THE INVENTION

An object of the present invention is therefore to mitigate the above-mentioned drawbacks by means of a mailpiece feed device that has specific drive members enabling the jogging of the mailpieces to be monitored and corrected. Another object of the invention is to propose a device that is particularly tolerant of improper positioning of the stacks of envelopes placed on the feeder.

These objects are achieved with a feeder for a mail-handling machine, which feeder has a mailpiece-receiving deck, a longitudinal referencing wall, at least one row of drive rollers comprising at least first and second drive rollers standing proud through said mailpiece-receiving deck, and a suitable drive mechanism for controlling said at least one row of drive rollers, said first and second drive rollers being inclined towards said longitudinal referencing wall at an angle a relative to a perpendicular to said longitudinal referencing wall, wherein said at least one row of drive rollers has means for driving said second drive roller in rotation with a first predetermined delay relative to said first drive roller which is the closer to said longitudinal referencing wall.

Thus, by means of this particular structure of the drive rollers, the envelopes are not brought suddenly into abutment against the referencing wall, but rather they pivot without coming into abutment in order to come into the conveying direction.

Advantageously, said first drive roller is constituted by a cylindrical wheel mounted on a wheel rim having a hub provided with a pusher abutment suitable for acting, after said first predetermined delay, to transmit drive torque to a drive abutment on said second drive roller. Said pusher abutment of said first drive roller and said drive abutment of said second drive roller are axially overlapping and, at rest, have a first predetermined angular offset between them. Said first predetermined angular offset is given by the following formula: $R1° = (x\alpha/nd)360°$; where x is the distance between said first and second drive rollers, and d is the diameter of said drive rollers.

Preferably, said at least one row further comprises a third drive roller and said third drive roller is driven in rotation with a second predetermined delay relative to said second drive roller.

Advantageously, said second drive roller is constituted by a cylindrical wheel mounted on a wheel rim having a hub that has a pusher abutment on a face opposite from said drive abutment, which pusher abutment is suitable for acting, after said second predetermined delay, to transmit drive torque to a drive abutment of said third drive roller. Said pusher abutment of said second drive roller and said drive abutment of said third drive roller are axially overlapping and, at rest, have a second predetermined angular offset between them. Said second predetermined angular offset is given by the following formula: $R2° = (y\alpha/nd)360°$; where y is the distance between said second and third drive rollers and d is the diameter of said drive rollers. Preferably, said first, second, and third drive rollers are disposed equidistantly so that said first and second angular offsets are identical.

In a preferred embodiment, the conveyor device of the invention has three parallel rows, each of which comprises three drive rollers.

Advantageously, a return spring is provided that is designed to urge the drive rollers back into their original positions, and that has each of its ends fastened into a respective groove or orifice designed for receiving it respectively in said pusher abutment and in said drive abutment. Clearance j is also provided between said return spring and a common rotary shaft for said drive rollers so that said common rotary shaft is not clamped during compression of the spring.

Preferably, said clearance is obtained by reducing the diameter of said common rotary shaft which interconnects two successive drive rollers.

BRIEF DESCRIPTION OF THE DRAWINGS

The invention can be better understood from the following detailed description given with non-limiting illustrative examples, and with reference to the following figures, in which.

DETAILED DESCRIPTION OF EMBODIMENTS

Figure 1:
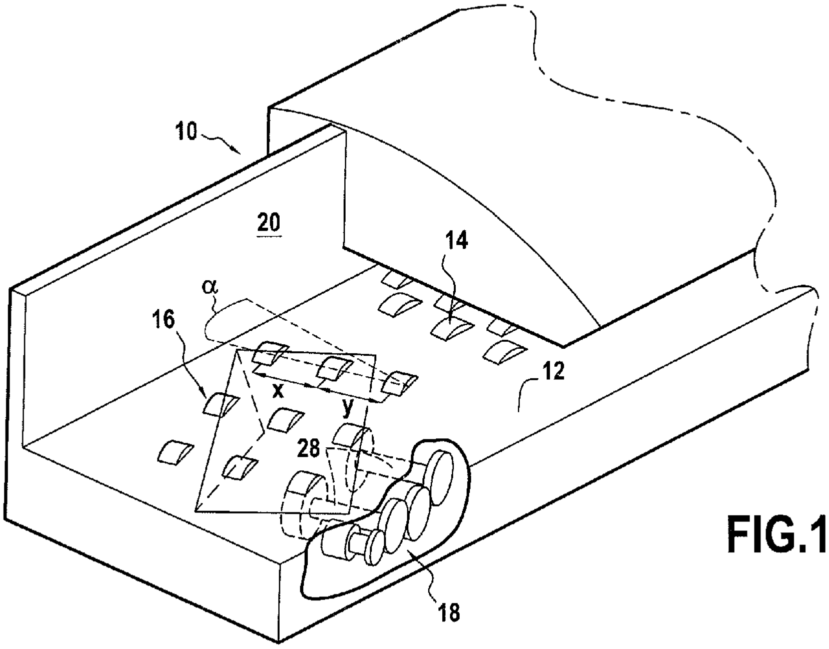
FIG. 1 is a perspective view of a feed device incorporating a conveyor device of the invention for a mail-handling machine.

A mailpiece feed device (or feeder) incorporating a conveyor device of the invention for a mail-handling machine is shown in FIG. 1. In conventional manner, this feeder 10 includes a mailpiece-receiving deck 12 on which the mailpieces to be printed are placed in a compact stack that may be homogeneous or otherwise (depending on whether or not the mailpieces are of the same size). The mailpieces are conveyed towards a selector device 14 by a conveyor device formed, in conventional manner, by a plurality of drive members such as conveyor rollers 16 standing proud through the mailpiece-receiving deck and controlled by a suitable drive mechanism 18.

Figure 2:
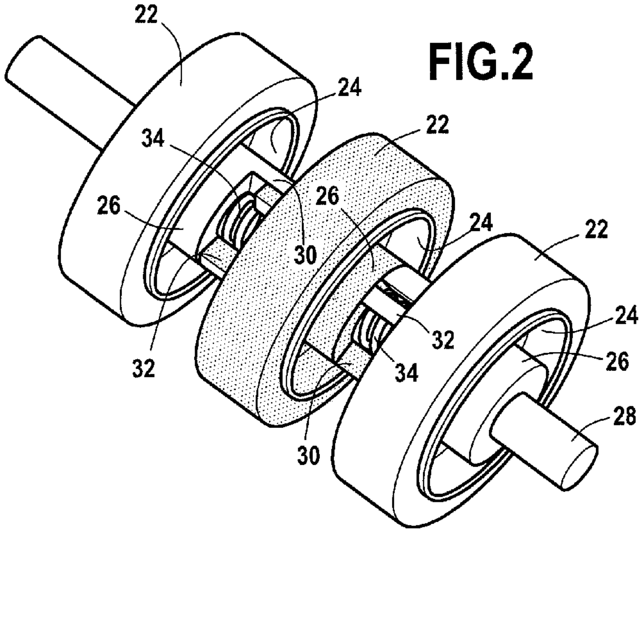
FIG. 2 is a perspective view of a row of rollers of the conveyor device shown in FIG. 1.
Figure 3:
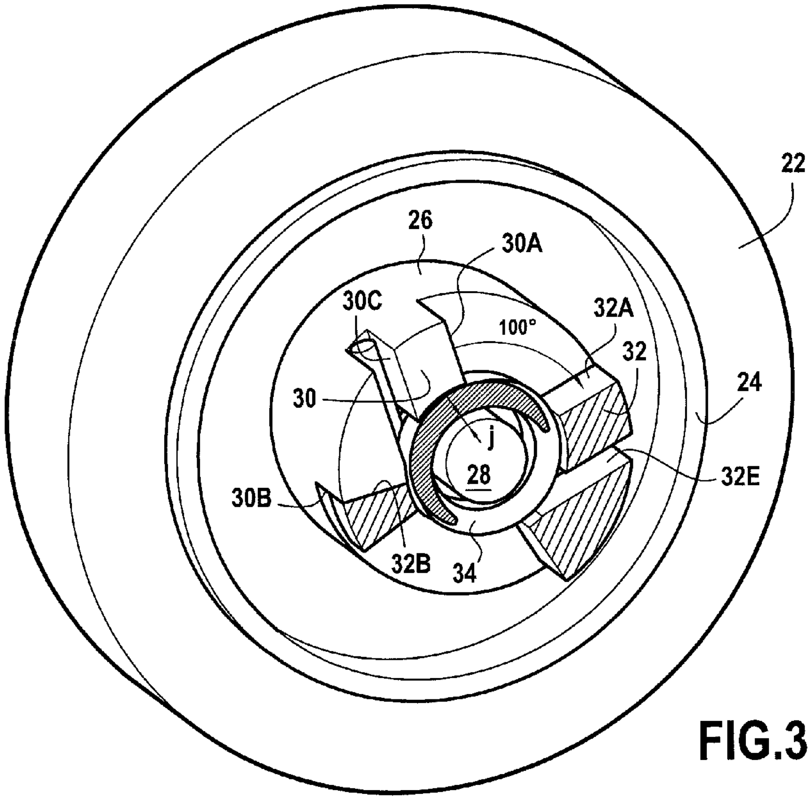
FIG. 3 is a section view at the drive coupling between two successive rollers shown in FIG. 2.

In accordance with the invention, said rollers 16 of the conveyor device are disposed in line in at least one row (in three parallel rows in this example) inclined at an angle of inclination a (typically lying in the range 10° to 40°) relative to a perpendicular to a reference wall 20 of the feeder and, as shown more particularly in FIGS. 2 and 3, each of said rollers is constituted by a cylindrical wheel 22 mounted on a wheel rim 24. Depending on the function of the wheel, the wheel rim's central hub 26 that fits over a common rotary shaft 28 carries a pusher abutment 30 (first and third rollers), or a drive abutment 32 (first and third rollers), or else both a pusher abutment and a drive abutment on respective ones of two opposite faces (second roller).

More precisely, each of the rows of rollers comprises at least two rollers (three rollers in this example), the roller that is closer or closest to the referencing wall being provided with the pusher abutment 30, the immediately following roller then having the drive abutment 32, these two abutments being axially overlapping in the manner of a jaw clutch but while having a predetermined angular offset (preferably less than 100°) between them at rest, so that the first roller turning causes the second roller to be turned only after a time delay depending on said offset and on the speed of rotation of the common shaft 28, when the pusher abutment of the first roller comes into contact with the drive abutment of the second roller.

Similarly, when, as shown, the row has three equidistant rollers rather than two, the second roller also has a pusher abutment 30 on the face of its hub 26 that is opposite from the hub face that has the drive abutment 32, which pusher abutment is suitable for co-operating in similar manner with a drive abutment 32 of the third roller, the predetermined angular offset existing at rest between these two abutments being identical to the preceding angular offset. Naturally, this configuration may be repeated with further successive rollers if the row has more than three rollers.

As shown in the example in FIG. 3, the pusher abutment 30, which forms a portion projecting forwards from the hub 26 of the first roller, extends over a first angular sector of about 80° between its surface 30A for transmitting the drive torque and its rest surface 30B, and is provided with a groove 30C or at least with an orifice for receiving and fastening the first end of a return spring 34 designed to urge the roller back into its original position once a batch of mailpieces has been processed. The drive abutment 32, which forms a portion projecting forwards from the hub 26 of the second roller, extends over a second angular sector of about 180° between its driven surface 32A and its rest surface 32B, and it is also provided with a groove 32C or at least with an orifice for receiving and fastening the other end of the return spring 34. Reference j indicates the clearance existing between said return spring and the common rotary shaft 28 so that the shaft is not clamped during compression of the spring, it being possible, for example, to obtain said clearance by reducing the diameter of said shaft between two rollers.

Naturally, the angular values of the first and second sectors are given merely by way of indication (they are also different from one roller to another when the angular offset is different), the essential requirement being to comply with a predetermined angular offset between the two abutments, and more precisely between the transmission surface 30A of the pusher abutment and the driven surface 32A of the drive abutment. For any given inclination a of the rollers, the value of said predetermined offset is given by the following generic formula $R° = (k\alpha/nd)360°$, where k is the distance (x or y in FIG. 1) between two rollers, and d is the diameter of a roller. Thus, for example, for an angle of inclination of 20° and for rollers having a diameter of 45 millimeters (mm), the same angular offset of 40° is obtained between two rollers that are also spaced apart by 45 mm. When the distance between the first roller and the second roller and the distance between the second roller and the third roller are different, angular offsets R that are different are naturally obtained.

The wheels are made of a material that is chosen with regard to the technical specifications (abrasion, friction, elasticity, hardness) expected from the drive, i.e. with a coefficient of friction that is sufficient to enable mailpieces to be driven towards the selector device. Such a material is, for example, silicone, natural rubber, polyurethane, or indeed ethylene propylene diene monomer (EPDM). Conversely, the wheel rim and its hub may be made of a low-cost material, e.g. of a material based on polyoxymethylene (POM).

The conveyor device operates as follows. With a first batch of envelopes being dumped in a stack on the mailpiece-receiving deck without worrying about aligning it against the referencing wall 20, switching on the feeder causes the common shaft 28 to rotate and thus causes the first rollers of each of the rows of the conveyor device to rotate, the other rollers then not being driven. This differential rotation causes the bottom envelope to advance and causes the batch of envelopes to pivot so that said batch starts to be placed in the conveying direction. After a few milliseconds due to the angular delay, the second rollers come into action and continue, in their turn, to drive the bottom envelope while also continuing to pivot the stack (which is then easier due to the simultaneous action of the first and second rollers of each of the rows) so that said stack comes into the conveying direction parallel to the referencing wall and then, a few milliseconds later, the third rollers come into action. Whereupon, all of the rollers are driven synchronously until there are no more envelopes in the stack, and until the last envelope of the batch is injected into the selector device. Once the last envelope has been injected, and under drive from the return springs 34, the pusher abutments 30 separate from the drive abutments 32 in which they are in contact so as to return to their original positions in order to process a subsequent batch.

What is claimed is:

1. A feeder for a machine for handling mailpieces, said feeder comprising:

a mailpiece-receiving deck, a longitudinal referencing wall, at least one row of drive rollers comprising at least first and second drive rollers standing proud through said mailpiece-receiving deck, and a drive mechanism for controlling said at least one row of drive rollers, said first and second drive rollers being inclined at an angle α relative to a perpendicular to said longitudinal referencing wall for shifting said mailpieces towards said longitudinal referencing wall while also conveying them downstream, wherein said second drive roller in the same row of said at least one row of drive rollers is driven in rotation with a first predetermined delay relative to said first drive roller which is the closer to said longitudinal referencing wall, so as to cause said mailpieces to pivot.

2. A feeder according to claim 1, wherein said first drive roller is constituted by a cylindrical wheel mounted on a wheel rim having a hub provided with a pusher abutment suitable for acting, after said first predetermined delay, to transmit drive torque to a drive abutment on said second drive roller.

3. A feeder according to claim 2, wherein said pusher abutment of said first drive roller and said drive abutment of said second drive roller are axially overlapping and, at rest, have a first predetermined angular offset between them.

4. A feeder according to claim 3, wherein said first predetermined angular offset is given by the following formula:

$$R1° = (x\alpha/\pi d)360°$$

where x is the distance between said first and second drive rollers, and d is the diameter of said drive rollers.

5. A feeder for a machine for handling mailpieces, said feeder comprising:

a mailpiece-receiving deck, a longitudinal referencing wall, at least one row of drive rollers comprising at least first and second drive rollers standing proud through said mailpiece-receiving deck, and a drive mechanism for controlling said at least one row of drive rollers, said first and second drive rollers being inclined at an angle α relative to a perpendicular to said longitudinal referencing wall for shifting said mailpieces towards said longitudinal referencing wall while also conveying them downstream, wherein said second drive roller in the same row of said at least one row of drive rollers is driven in rotation with a first predetermined delay relative to said first drive roller which is the closer to said longitudinal referencing wall, so as to cause said mailpieces to pivot, and wherein said at least one row of drive rollers further comprises a third drive roller in the same row and said third drive roller is driven in rotation with a second predetermined delay relative to said second drive roller.

6. A feeder according to claim 5, wherein said second drive roller is constituted by a cylindrical wheel mounted on a wheel rim having a hub that has a pusher abutment on a face opposite from said drive abutment, which pusher abutment is suitable for acting, after said second predetermined delay, to transmit drive torque to a drive abutment of said third drive roller.

7. A feeder according to claim 6, wherein said pusher abutment of said second drive roller and said drive abutment of said third drive roller are axially overlapping and, at rest, have a second predetermined angular offset between them.

8. A feeder according to claim 7, wherein said second predetermined angular offset is given by the following formula:

$$R2° = (y\alpha/\pi d)360°$$

where y is the distance between said second and third drive rollers and d is the diameter of said drive rollers.

9. A feeder according to claim 5, wherein said first, second, and third drive rollers are disposed equidistantly so that said first and second angular offsets are identical.

10. A feeder according to claim 9, having three parallel rows, each of which comprises three drive rollers.

11. A feeder according to claim 2, further having a return spring designed to urge the drive rollers back into their original positions, and having each of its ends fastened into a respective groove or orifice designed for receiving it respectively in said pusher abutment and in said drive abutment.

12. A feeder according to claim 11, further having clearance j between said return spring and a common rotary shaft for said drive rollers so that said common rotary shaft is not clamped during compression of the spring.

13. A feeder according to claim 12, wherein said clearance is obtained by reducing the diameter of said common rotary shaft which interconnects two successive drive rollers.

* * * * *